June 22, 1943.   L. T. SEPIN   2,322,546
RIM FOR TIRE RETREADING APPARATUS
Filed Aug. 19, 1940   2 Sheets-Sheet 1

INVENTOR.
LEE T. SEPIN
BY Edwin D. Jones
ATTORNEY.

June 22, 1943.  L. T. SEPIN  2,322,546
RIM FOR TIRE RETREADING APPARATUS
Filed Aug. 19, 1940  2 Sheets-Sheet 2
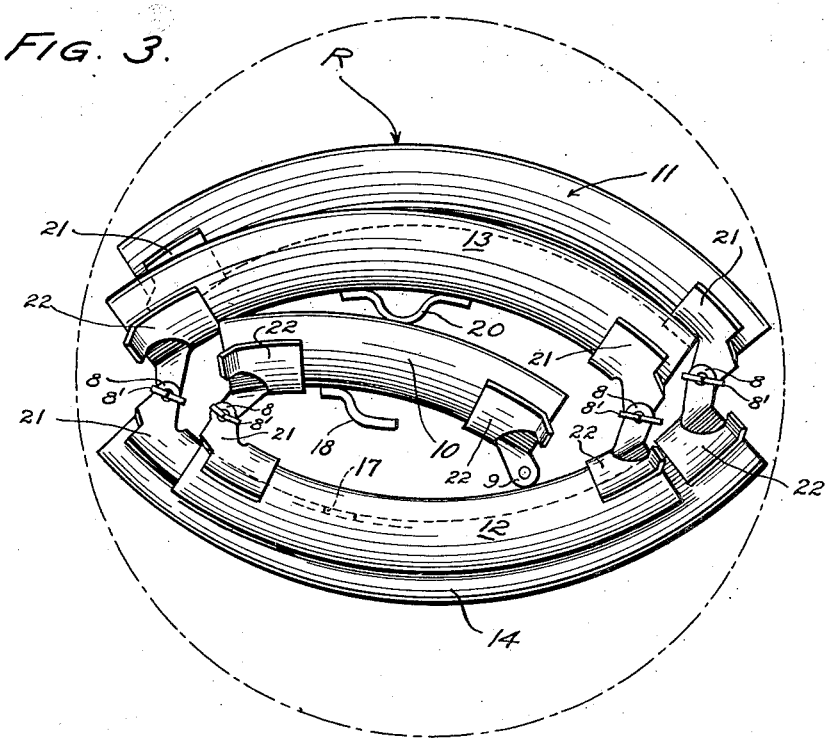
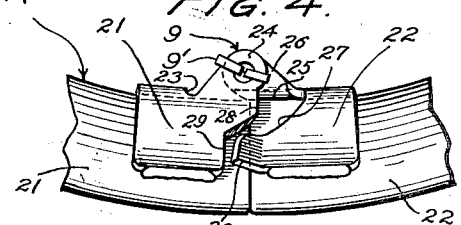
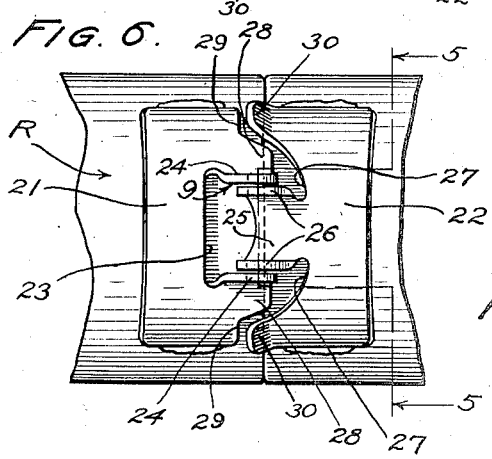
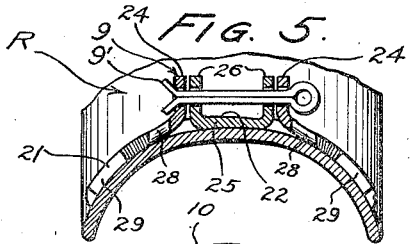
INVENTOR.
LEE T. SEPIN
BY Edwin D. Jones
ATTORNEY.

Patented June 22, 1943

2,322,546

UNITED STATES PATENT OFFICE 2,322,546

RIM FOR TIRE RETREADING APPARATUS

Lee T. Sepin, Los Angeles, Calif.

Application August 19, 1940, Serial No. 353,223

2 Claims. (Cl. 16—128)

My invention relates in general to tire retreading apparatus and in particular to a new and highly efficient type of collapsible and floating rim for retaining the conventional annular air bag in the desired position in a tire carcass or casing during the retreading thereof in a full circle retreading mold.

A purpose of my invention is to provide a collapsible rim of the character described wherein a plurality of arcuate sections and hinges are especially constructed and arranged so that the rim may be collapsed with the sections nesting in such small compass and so related as to make possible the ready extension of the sections into the carcass of the smaller sizes of tires now in popular use, to form therein a rigid annular support which will retain the air bag in position to insure a uniform and more nearly perfect vulcanizing and retreading operation.

Another purpose of my invention is to provide an air bag supporting rim wherein the sections are coupled by means of hinges of such construction and arrangement as will not only afford a ready collapsing of the rim into small compass, and facilitate the extension of the rim into annular form lying interiorly of the carcass, but also serve to effectively brace the rim and prevent relative movement of the sections thereof when extended into annular form for retaining the air bag in place.

Yet another important feature of my invention is the provision in a collapsible rim of the character described, of sections or segments of varying lengths and such relative arrangement as will make possible the folding or collapsing of the rim into comparatively small compass and also render easier the extension and collapsing thereof with respect to all sizes of tires but particularly in the smaller sizes now more generally in use. This is essential inasmuch as with the rings or rims heretofore available for supporting air bags, it has been difficult and in some instances impossible to properly position the rims and air bags in tires of say, from 20 to 17 inches in diameter.

I will describe only one form of tire retreading apparatus embodying my invention and will then point out the novel features thereof in claims.

In the accompanying drawings:

Fig. 3 is an enlarged side elevation of the rim as when collapsed, the dashed line indicating the inner perimeter of a tire carcass to illustrate how the rim may be extended into circular form or collapsed, when surrounded by or disposed within the carcass.

Fig. 4 is a fragmentary side elevation of the rim particularly showing the hinge, as when the rim is in position of use.

Fig. 5 is a cross section taken on the line 5—5 of Fig. 6 showing details of the hinge.

Fig. 6 is a fragmentary top plan view of a joint of the rim, showing the hinge construction.

Fig. 7 is a schematic view of the rim showing it in collapsed and extended positions in dashed and full lines respectively.

Figure 1:
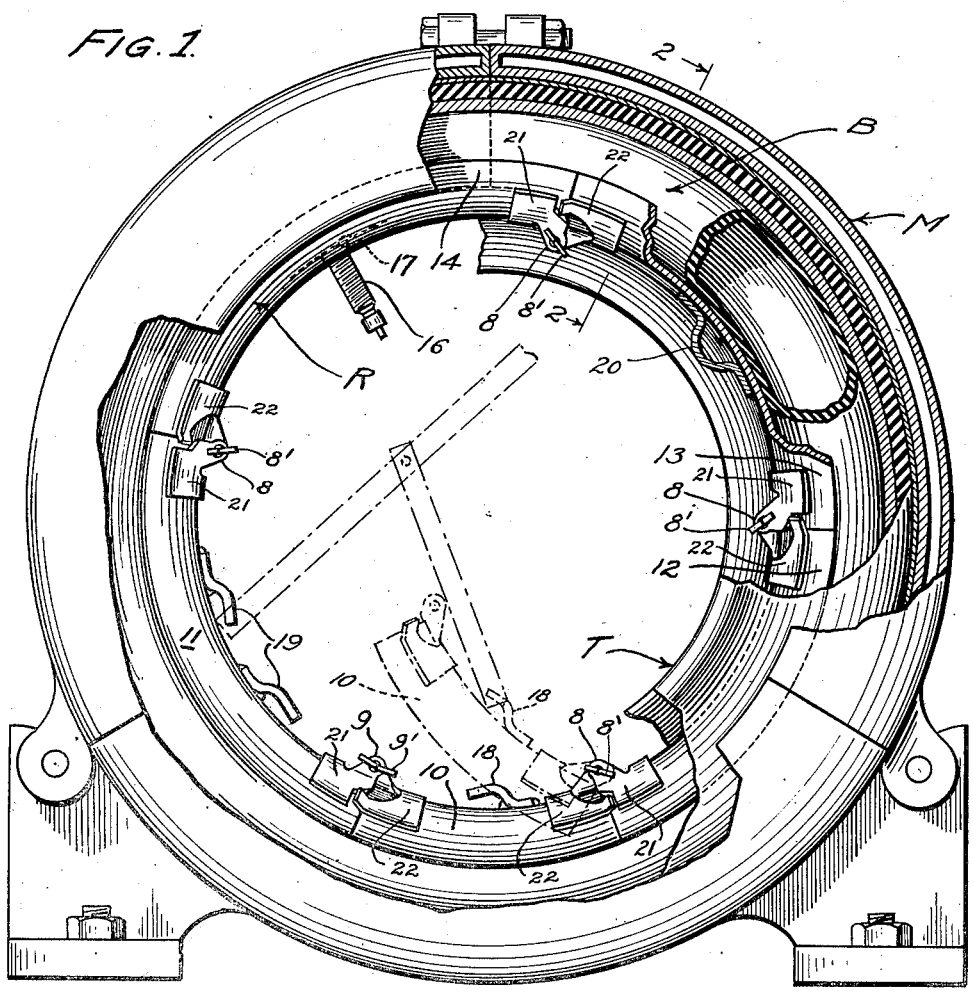
Fig. 1 is a fragmentary side elevation of a full circle tire retreading mold as equipped with an air bag supporting rim embodying my invention, parts of the mold and associated elements being broken away and other parts shown in section, for clarity.

In the accompanying drawings I have shown an annular and collapsible rim R embodying my invention and as when employed for holding an annular air bag B within a tire carcass T so that the latter will be forced against the steam chambered mold M of a conventional "full circle" retreading apparatus whereby to insure the desired vulcanizing and retreading operation.

As here provided, the rim R is made up of a plurality of, preferably five, arcuate sections or segments of varying lengths and each curved in cross section to conform to the air bag and confine the contact of the latter to the tread portion only of the carcass. These segments are coupled end to end by means of hinges 8 and 9 of identical construction except that hinge 9 has a removable hinge pin 9' whereby the rim may be collapsibly secured in annular form.

In the present form of rim, the separable sections or segments which are joined by the hinge 9 and removable hinge pin 9' constitute the shortest segment designated 10 and one of the longest segments, designated 11, respectively. From the shortest segment 10, the other segments 12, 13 and 14 respectively, are successively longer than one another, it being noted that the segment 14 is substantially the same length as segment 11. As an example, segment 10 may have an arc of 53 degrees; section 12, 66 degrees; section 13, 73 degrees; and sections 11 and 14 each 84 degrees. For smaller size tires I find it desirable to vary these dimensions and the sections in the order above named may have arcs of 50, 60, 71, 87 and 87 degrees respectively. However, it is understood that I do not wish to be limited to the lengths and degrees of arc above noted and these dimensions may be varied inasmuch as the main purpose is to provide varying lengths of segments which will closely nest in smaller compass than has heretofore been the practice in the art, and afford an easier extension and collapsing of the rim regardless of the size of the tire.

When the rim is collapsed as shown in Fig. 3, the segment 10 is innermost and disposed between segments 12 and 13 in nesting relation to segment 13—; whereas the segments 11 and 14 are outermost and segment 13 nests with segment 11, while segment 12 nests with segment 14. It is now seen that the varying lengths of the segments make possible this nesting and compact folding of the rim so that in folded form it may be positioned within a tire carcass having the air bag therein. The lengths of the segments are such that those which nest, particularly segments 10, 12 and 13 contact their companion segments between the hinges. In other words, the varying lengths prevent the hinges from interfering with a compact folding and nesting of the sections.

Figure 2:
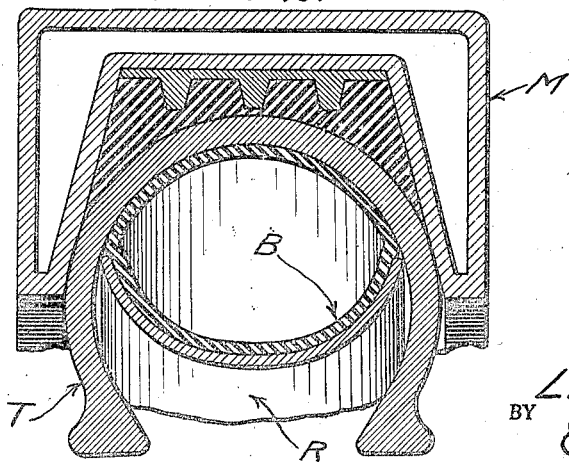
Fig. 2 is a cross sectional view taken on the line 2—2 of Fig. 1.

The inner periphery of the carcass is indicated by the circle in Fig. 3 and it is seen that with the rim collapsed and positioned as there shown, the segments may be readily unfolded and extended in the order 11, 14, 13, 12 and 10, or otherwise, whereby to provide an annular rim lying within the carcass as shown in Figs. 1 and 2. In applying segment 14 to the air bag the valve stem 16 is extended through an opening 17 in said segment, in fact, this may be the first step in the extension of the segments to annular form, and thereafter the other segments are unfolded and may be extended in the order above named.

After the extension of the segments, a suitable expansion tool is applied to lugs 18 and 19 on the "end" segments 10 and 11, as shown in Fig. 1, and manipulated to aline the segments and bring them to a true annular form, following which the hinge pin 9' is inserted in hinge 9 and the segments are locked together by the interfitting of the hinges as will be hereinafter described. Obviously, to remove the rim from the carcass, the hinge pin 9' is removed and the segments are collapsed as shown in Fig. 3, the use of a tool being sometimes necessary to start the collapsing or folding of the segments.

In folding or collapsing the segments, segment 10 is folded back upon section 12, then segments 12 and 10 are swung bodily so that section 10 partially nests with section 13; next the sections 13, 12 and 10 are swung so that section 12 nests fully with section 14, and finally section 11 is swung to partially nest with section 13. The nesting of sections 10 and 11 with the section 13 is but partial due to the presence of the lugs 19 on the section 11, and a loop or eye 20 on the section 13. This loop or eye is employed to conveniently hang up the rim when opening the mold.

The hinges 8 and 9 are identical, and each, as seen in Figs. 4, 5 and 6, comprises a pair of butt plates 21 and 22 which are arcuate longitudinally as well as transversely to conform to the curvatures of the rim segments. These butt plates are welded about their margins to the segments and may also be spot welded thereto so that they will be firmly secured in place. The butt plate 21 is provided at its outer transverse edge with a recess 23 formed by striking outwardly the spaced ears 24. The plate 22 is formed with a central tongue 25 which extends beyond the adjacent edge of the segment to which plate 22 is welded, whereby it is adapted to extend into the recess 23 and overlap and closely engage the segment to which the plate 21 is welded, as shown in Fig. 6 and Fig. 5. This tongue is formed by striking outwardly from the plate 22 the opposed ears 26 which are adapted to lie between and contact ears 24. The ears 26 are cut out so as to form notches or recesses 27 on opposite sides of the tongue 25 as shown in Fig. 6, for reception of projecting portions 28 of the plate 21. The projecting portions overlap and engage the segment to which plate 22 is welded. As a further means for interlocking the butt plates and locking the segments against relative movement radially, laterally or otherwise, the front edge of butt plate 21 is recessed at its corners as at 29 for reception of projecting portions 30 at corresponding corners of the butt plate 22. The portions 30 overlap and contact the segment on which plate 21 is welded and are turned outwardly at their free ends to permit of free hinge action of the plates and segments.

The ears 24 and 26 of the plates 21 and 22 of the hinges 8 and 9 are apertured for reception of the hinge pins 8' and 9', the latter of which are removable and insertable at will. These pins may be in form of cotter pins as here shown or in any suitable form, and while only one need be removable, a plurality of removable pins could be used if desired.

It is now seen that each hinge plate 21 has the projecting portions 28 on opposite sides of the recess 23 therein, for overlapping and contacting the next adjacent segment of the rim, whereas each plate 22 has the tongue 25 and projecting portions 30 on opposite sides of the tongue for overlying the segment to which plate 21 is secured. These overlapping portions insure the maintenance of a true annular and rigid floating rim for supporting the air bag, in that the segments of the rim are thereby held against unintentional relative movement and the rim is effectively braced at its joints.

It should be noted that by reason of the particular relative arrangement of the segments and the varying lengths thereof also the construction and arrangement of the hinges, the rim may be readily collapsed with the segments lying in opposed groups and in nested and outwardly bowed relation in each group. When thus collapsed the rim may be placed so that it will be surrounded by the carcass and from such position the segments may be successively or otherwise extended into the annular body of the carcass to form a rigid annular air bag supporting rim therein in a much more expeditious and reliable manner than heretofore possible with air bag rims. The advantages of the rim of my invention and its efficient use in retreading the smaller tires now in general use, are enhanced by the use of at least five segments of which the majority are of varying lengths, inasmuch as a five segment rim will permit of a collapsing of the ring into smaller compass than a rim of less than five segments.

I claim:

1. A hinge for connecting adjacent segments of an air bag supporting rim used in tire retreading apparatus, comprising a pair of plates adapted to be fixed to opposed ends of adjacent segments, one of said plates having a recess in its outer end and provided with projections on opposite sides of the recess for overlapping the adjacent segment, apertured ears on said projections, the other plate having a tongue adapted to extend into the recess of the first named plate and overlie the segment to which the first named plate is secured, apertured ears on said tongue, a hinge pin extending through the apertures in the ears of both plates, said first named plate having recesses in outer corners thereof; and corner projections on the second named plate being extensible into said recesses and engageable with the segment on which the first named plate is secured.

2. A hinge for connecting adjacent segments of an air bag supporting rim used in tire retreading apparatus, comprising a pair of plates adapted to be fixed to opposed ends of adjacent segments, one of said plates having a recess in its outer end and provided with projections on opposite sides of the recess for overlapping the adjacent segment, apertured ears on said projections, the other plate having a tongue adapted to extend into the recess of the first named plate and overlie the segment to which the first named plate is secured, apertured ears on said tongue, a hinge pin extending through the ears of both plates, said first named plate having recesses in outer corners thereof; and corner projections on the second named plate being extensible into said recesses and engageable with the segment on which the first named plate is secured, said corner projections having outwardly turned free ends.

LEE T. SEPIN.